United States Patent
Christen et al.

(10) Patent No.: US 10,625,669 B2
(45) Date of Patent: Apr. 21, 2020

(54) VEHICLE SENSOR OPERATION

(71) Applicant: Ford Global Technologies, LLC, Dearborn, MI (US)

(72) Inventors: Erik J. Christen, Royal Oak, MI (US); Prasad Venkiteswaran, Canton, MI (US); Maher Ghneim, Plymouth, MI (US); Adriano Castelvetere, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/901,653

(22) Filed: Feb. 21, 2018

(65) Prior Publication Data

US 2019/0255994 A1    Aug. 22, 2019

(51) Int. Cl.
*B60Q 5/00* (2006.01)
*H04R 1/22* (2006.01)

(52) U.S. Cl.
CPC ........ *B60Q 5/00* (2013.01); *H04R 1/22* (2013.01)

(58) Field of Classification Search
None
See application file for complete search history.

(56) References Cited

U.S. PATENT DOCUMENTS

| | | | | |
|---|---|---|---|---|
| 5,087,851 A * | 2/1992 | Nakazawa | ............... | B60J 1/17 310/323.16 |
| 5,664,020 A * | 9/1997 | Goldfarb | ............... | H04R 1/02 181/196 |
| 5,889,870 A * | 3/1999 | Norris | ............... | G10K 15/02 381/77 |
| 6,229,899 B1 * | 5/2001 | Norris | ............... | G10K 15/02 381/77 |
| 6,250,255 B1 * | 6/2001 | Lenhardt | ............... | A01M 29/16 119/713 |
| 6,577,738 B2 * | 6/2003 | Norris | ............... | G10H 1/0091 381/77 |
| 6,778,672 B2 * | 8/2004 | Breed | ............... | B60R 21/01552 381/86 |
| 7,109,789 B2 * | 9/2006 | Spencer | ............... | H03F 3/2171 330/10 |
| 7,388,962 B2 * | 6/2008 | Cheung | ............... | H04S 1/00 379/412 |
| 7,463,165 B1 * | 12/2008 | Hessing | ............... | G08B 3/10 340/435 |
| 7,564,981 B2 * | 7/2009 | Croft, III | ............... | G10K 15/02 367/137 |
| 7,596,229 B2 * | 9/2009 | Croft, III | ............... | H04B 5/0006 381/77 |

(Continued)

FOREIGN PATENT DOCUMENTS

| | | |
|---|---|---|
| DE | 102009060177 A1 | 10/2010 |
| JP | 2008258863 A | 10/2008 |

*Primary Examiner* — Steven Lim
*Assistant Examiner* — Muhammad Adnan
(74) *Attorney, Agent, or Firm* — Frank A. MacKenzie; Bejin Bieneman PLC

(57) ABSTRACT

A system includes a computer including a processor and a memory, the memory storing instructions executable by the processor to emit a first sound from a vehicle ultrasonic sensor in an ultrasonic frequency range and actuate a frequency modifier to modify a frequency of the emitted sound to emit a second sound in an audible frequency range.

9 Claims, 7 Drawing Sheets

(56) References Cited

U.S. PATENT DOCUMENTS

| | | | | |
|---|---|---|---|---|
| 7,747,029 B2* | 6/2010 | Kim | | H04R 23/00 |
| | | | | 381/152 |
| 7,805,114 B1* | 9/2010 | Quintana | | G06F 1/163 |
| | | | | 370/338 |
| 8,217,766 B2 | 7/2012 | Nakayama | | |
| 8,451,143 B2* | 5/2013 | Nakayama | | B60Q 5/008 |
| | | | | 180/167 |
| 8,537,030 B2* | 9/2013 | Perkins | | B60Q 1/506 |
| | | | | 340/425.5 |
| 8,538,036 B2* | 9/2013 | Pompei | | H04R 5/02 |
| | | | | 381/77 |
| 8,712,615 B2* | 4/2014 | Omote | | G10K 15/02 |
| | | | | 701/22 |
| 9,593,522 B1* | 3/2017 | Murar | | E05F 15/77 |
| 9,630,557 B2* | 4/2017 | Hoepner | | G08G 1/166 |
| 9,679,474 B2* | 6/2017 | Kaminade | | G08G 1/166 |
| 10,284,961 B2* | 5/2019 | Margalit | | H04R 7/10 |
| 2002/0101360 A1* | 8/2002 | Schrage | | G08G 1/095 |
| | | | | 340/901 |
| 2002/0118601 A1* | 8/2002 | Freund | | G10K 9/10 |
| | | | | 367/137 |
| 2005/0090962 A1* | 4/2005 | Ota | | F16H 3/663 |
| | | | | 701/51 |
| 2005/0152561 A1* | 7/2005 | Spencer | | H03F 3/2171 |
| | | | | 381/77 |
| 2007/0252854 A1* | 11/2007 | Ueno | | G06F 1/1601 |
| | | | | 345/649 |
| 2008/0094254 A1* | 4/2008 | Hill | | B60Q 5/00 |
| | | | | 340/944 |
| 2008/0230035 A1* | 9/2008 | Inoue | | F02D 33/003 |
| | | | | 123/497 |
| 2008/0257544 A1* | 10/2008 | Thigpen | | E21B 47/10 |
| | | | | 166/250.01 |
| 2009/0066499 A1 | 3/2009 | Bai et al. | | |
| 2009/0167519 A1* | 7/2009 | Kracker | | B60Q 5/00 |
| | | | | 340/475 |
| 2009/0303035 A1* | 12/2009 | Kirtley, Jr. | | B66F 9/0755 |
| | | | | 340/539.11 |
| 2009/0312849 A1* | 12/2009 | Cosgrove | | H04S 7/303 |
| | | | | 700/28 |
| 2011/0032122 A1* | 2/2011 | Hayashi | | G08G 1/04 |
| | | | | 340/943 |
| 2011/0175713 A1* | 7/2011 | Nakayama | | B60Q 5/006 |
| | | | | 340/435 |
| 2013/0044904 A1* | 2/2013 | Margalit | | H04R 17/00 |
| | | | | 381/182 |
| 2013/0234844 A1* | 9/2013 | Yopp | | B60Q 9/008 |
| | | | | 340/435 |
| 2014/0029782 A1* | 1/2014 | Rayner | | H04R 1/2834 |
| | | | | 381/386 |
| 2014/0257630 A1* | 9/2014 | Ruiz | | E05B 77/54 |
| | | | | 701/36 |
| 2015/0023138 A1 | 1/2015 | Liu et al. | | |
| 2018/0009378 A1* | 1/2018 | Myers | | B60Q 9/008 |

* cited by examiner

VEHICLE SENSOR OPERATION

BACKGROUND

Vehicles often generate sounds upon actuation of vehicle components. The sounds can be received by pedestrians and other objects near the vehicle. For example, an internal combustion engine can generate sounds perceptible by nearby pedestrians. Such sounds can serve to warn, e.g., a pedestrian, of a vehicle's approach A vehicle computer can include a dedicated sound-generating device, e.g., as part of a dedicated Audible Vehicle Alert System (AVAS), that generates sounds in an audible frequency range. However, AVAS or other systems dedicated to output of external sounds can increase costs, e.g., of computing resources, manufacturing, weight, etc., and can exceed space constraints in the vehicle.

DETAILED DESCRIPTION

Figure 1:
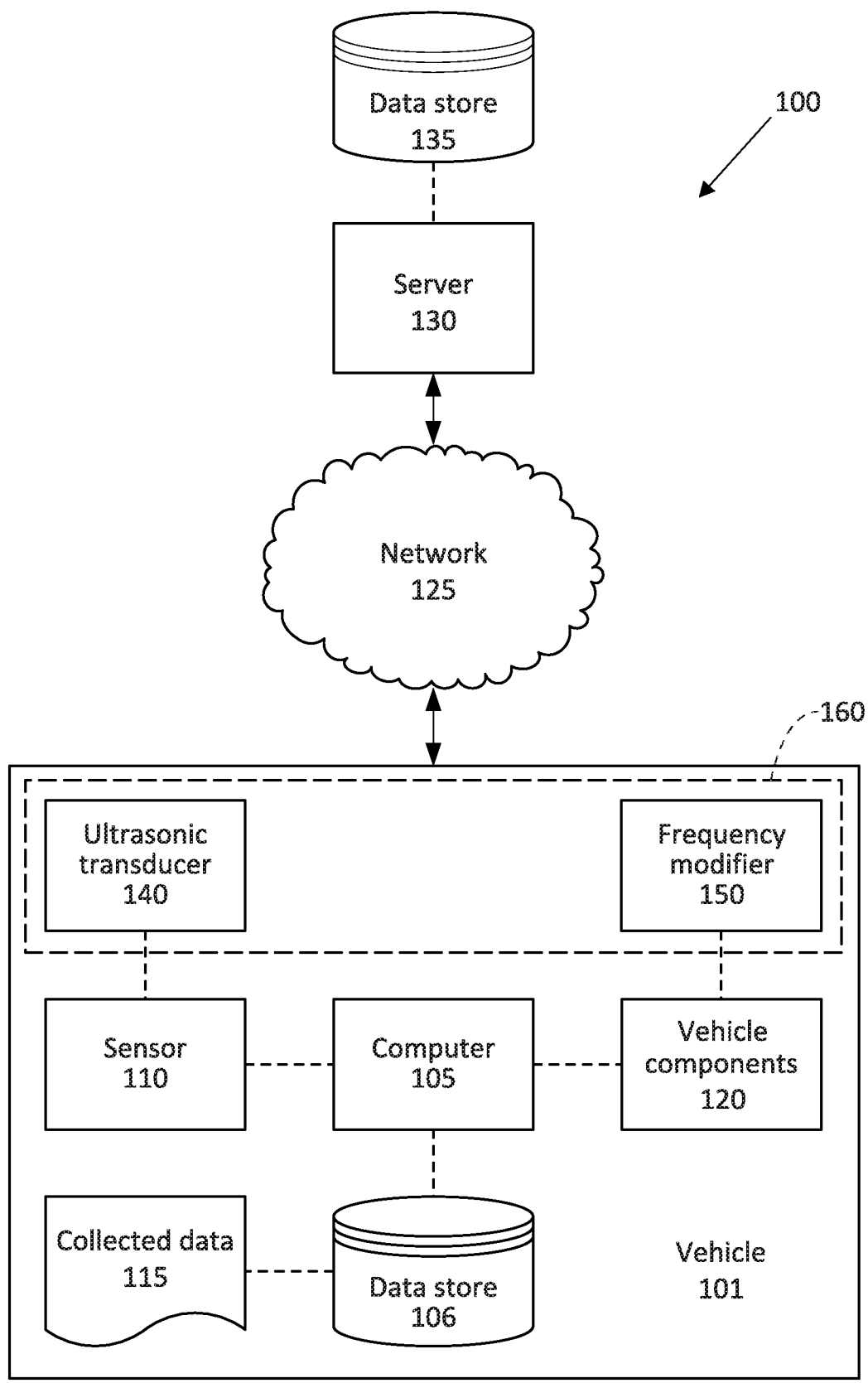
FIG. 1 is a block diagram of an example system for emitting a sound from a vehicle.

A system includes a computer including a processor and a memory, the memory storing instructions executable by the processor to emit a first sound from a vehicle ultrasonic sensor in an ultrasonic frequency range and actuate a frequency modifier to modify a frequency of the emitted sound to emit a second sound in an audible frequency range.

The frequency modifier can include a tube having a first opening and a second opening and a door rotatably attached to the first opening. The instructions can further include instructions to open the door to modify the frequency of the emitted sound when the emitted sound exits the second opening.

The frequency modifier can include a fluid tank in communication with a fluid reservoir. The instructions can further include instructions to actuate a fluid pump to fill the fluid tank with liquid fluid from the fluid reservoir to modify the frequency of the first sound.

The frequency modifier can include a sheet movable from a stowed position to a deployed position. The instructions can further include instructions to move the sheet to the deployed position to modify the frequency of the first sound. The sheet can have a resonant frequency that is a rational multiple lower than a frequency of the first sound.

The frequency modifier can include a telescoping tube movable from a stowed position to a deployed position. The instructions can further include instructions to move the telescoping tube to the deployed position to modify the frequency of the first sound. The instructions can further include instructions to move the telescoping tube to an intermediate position between the stowed position and the deployed position.

The ultrasonic sensor can include an emitter and a base, and wherein the instructions further include instructions to rotate the emitter to a specified angle relative to the base. The instructions can further include instructions to rotate the emitter between a first specified angle relative to the base and a second specified angle relative to the base.

A system includes a vehicle ultrasonic sensor including an emitter and means for modifying a frequency of a first sound emitted from the emitter in an ultrasonic frequency range to emit a second sound in an audible frequency range.

The modifying means can further include a door movable from a closed position to an open position.

The modifying means can further include means for filling a fluid tank with a fluid and means for transmitting the first sound through the fluid.

The modifying means can further include a sheet movable from a stowed position to a deployed position and means for moving the sheet to the deployed position, wherein when the sheet is in the deployed position, the sheet receives the first sound.

The modifying means can further include a telescoping tube movable from a stowed position to a deployed position.

The system can further include a computer programmed to actuate the vehicle ultrasonic sensor to emit the first sound.

A system includes a vehicle ultrasonic sensor including an emitter and a frequency modifier including at least one of a tube, a sheet, and a fluid tank, the frequency modifier having a resonant frequency in an audible frequency range and arranged to receive a sound from the emitter.

The tube can be a telescoping tube movable from a stowed position to a deployed position.

The tube can further include a first opening and a second opening and a door rotatably attached to the first opening.

The sheet can be movable from a stowed position to a deployed position in front of the emitter.

The fluid tank can further include a liquid fluid that emits a second sound in the audible frequency range.

Modifying a sound emitted from an ultrasonic transducer to a second sound in an audible frequency range allows a vehicle computer to generate the second sound in the audible frequency range using existing ultrasonic transducers. The ultrasonic transducers can serve as a sound output system to supplement (e.g., serve as a backup) or replacement for a conventional Audible Vehicle Alert System (AVAS). A frequency modifier can modify the sound from the ultrasonic transducer. The frequency modifier can be a mechanical device constructed to reduce the frequency of the emitted sound from the ultrasonic transducer to generate the second sound in the audible frequency range. The frequency modifier can thus provide AVAS capability to the ultrasonic transducer without additional components.

FIG. 1 illustrates an example system 100 for operating a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a Controller Area Network (CAN) or the like. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components provided to perform a mechanical or electro-mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

One of the sensors 110 can be an ultrasonic transducer 140. As described below, the ultrasonic transducer 140 emits sounds in an ultrasonic frequency range, e.g., from 50 kilohertz (kHz) to 10 megahertz (MHz). The computer 105 can actuate the ultrasonic transducer 140 to emit a sound in the ultrasonic frequency range and receive the emitted sound reflected from an object, e.g., another vehicle 101. Based on a time elapsed between emission and receipt of the sound, the computer 105 can determine a distance between the vehicle 101 and the object. Because the ultrasonic transducer 140 emits sounds in the ultrasonic frequency range, the emitted sounds are not perceptible to humans.

The vehicle 101 includes a frequency modifier 150. The frequency modifier 150 modifies a frequency of a sound emitted from the ultrasonic transducer 140 into an audible frequency range. As described below, the frequency modifier 150 can receive the sound emitted from the ultrasonic transducer 140, which has a frequency in the ultrasonic range, and reduce the frequency to a frequency in the audible frequency range to provide an alert that is expected to be audible to human ears, e.g., to nearby pedestrians, cyclists, etc. The frequency modifier 150 can be a device that has a resonant frequency in the audible frequency range, i.e., the frequency modifier 150 can, upon receiving input, vibrate at a specific frequency to generate a sound perceptible to human ears. For example, the frequency modifier 150 can be a tube that has a fundamental frequency in the audible range, a fluid tank, a sheet constructed of a material with a specific resonant frequency, a telescoping tube, etc. The computer 105 can actuate the frequency modifier 150 upon determining to generate a sound in the audible frequency range. As is known, the "audible" frequency range is a range of frequencies of sounds that are typically perceptible to a human, i.e., between 20 Hz and 20 kHz. The ultrasonic transducer 140 and the frequency modifier 150 can comprise a sound generator 160.

The computer 105 can actuate the ultrasonic transducer 140 and the frequency modifier 150 to emit a sound in the audible frequency range, e.g., as part of an Audible Vehicle Alert System (AVAS). The AVAS generates an audible sound to warn pedestrians of the presence of the vehicle. The frequency modifier 150 allows the computer 105 to actuate the ultrasonic transducer 140 as part of the AVAS. That is, the ultrasonic transducer 140 emits a sound in the ultrasonic frequency range, and thus typically cannot be used in the AVAS. With the frequency modifier 150, the computer 105 can use the ultrasonic transducer 140 as part of the AVAS, reducing the total number of components in the vehicle 101 and/or providing redundancy for existing AVAS sound generators.

Figure 2:
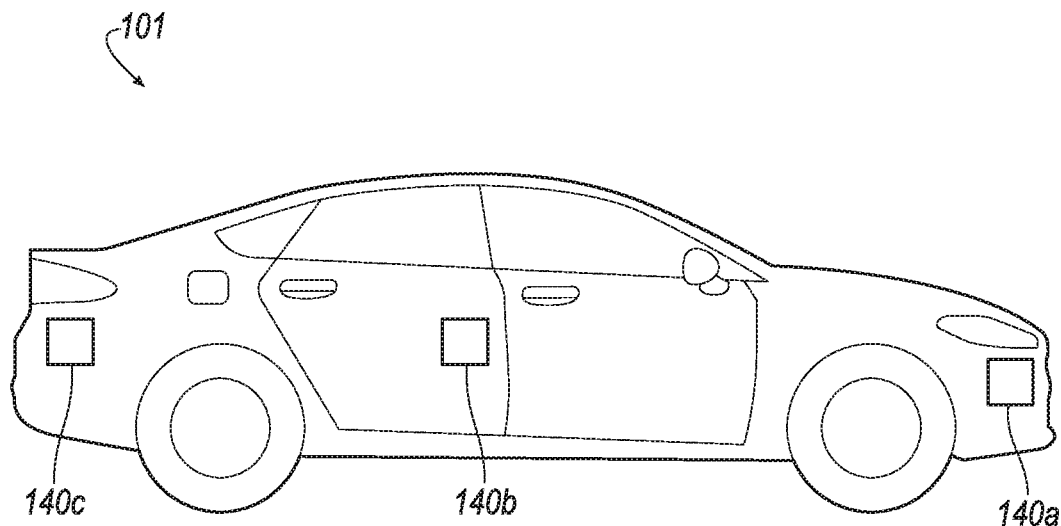
FIG. 2 illustrates an example vehicle with ultrasonic transducers.

FIG. 2 illustrates an example vehicle 101 with a plurality of ultrasonic transducers 140. In the example of FIG. 2, the vehicle 101 has three ultrasonic transducers 140a, 140b, 140c. The computer 105 can actuate the ultrasonic transducers 140a, 140b, 140c to emit sounds in an ultrasonic frequency range to determine a distance between each of the ultrasonic transducers 140a, 140b, 140c and objects such as nearby pedestrians, cyclists, etc. As shown in FIG. 2, the ultrasonic transducer 140a can be disposed at a front end of the vehicle 101 to detect objects in front of the vehicle 101. The ultrasonic transducer 140b can be disposed in a vehicle 101 door to detect objects to a side of the vehicle 101. The ultrasonic transducer 140c can be disposed at a rear end of the vehicle 101 to detect objects behind the vehicle 101. Each ultrasonic transducer 140 can include a respective frequency modifier 150 (not shown in FIG. 2) to emit a sound in an audible frequency range.

Figure 3:
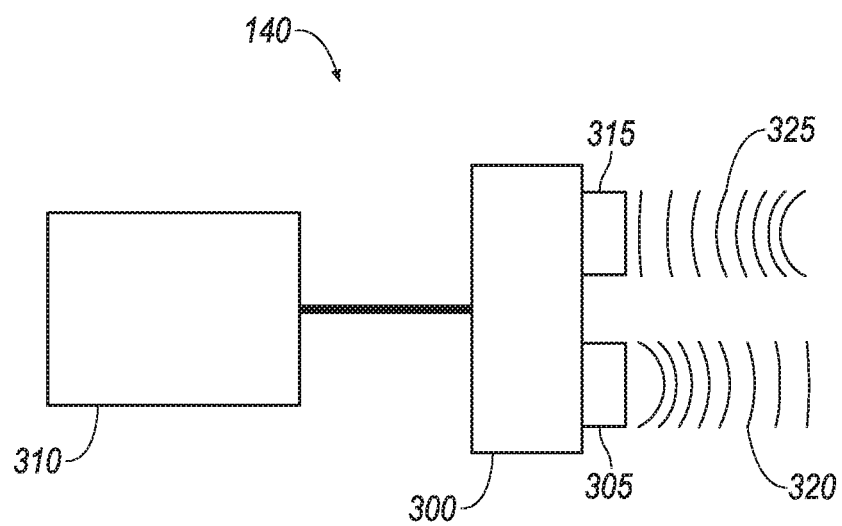
FIG. 3 illustrates an example ultrasonic transducer.

FIG. 3 illustrates an example ultrasonic transducer 140. The ultrasonic transducer 140 can be of a conventional design, and can include a base 300, an emitter 305, an amplifier 310, and a receiver 315. The base 300 supports the emitter 305 and the receiver 315. The base 300 can be attached to the vehicle 101 body, e.g., in a vehicle 101 door, in a vehicle 101 wheel well, in a vehicle 101 bumper, etc. The base 300 can be constructed of a rigid material, e.g., a metal, a plastic, a ceramic, etc., to support the emitter 305 and the receiver 315.

The ultrasonic transducer 140 includes the emitter 305. The emitter 305 generates a sound 320 at a frequency in an ultrasonic frequency range. The computer 105 can actuate the emitter 305 to emit a first sound 320 at a specified frequency in the ultrasonic frequency range. The emitter 305 can be, e.g., a piston-type piezoelectric disk, a capacitive micromachined element with a membrane and a backing plate, etc.

The ultrasonic transducer 140 includes the amplifier 310. The amplifier 310 receives a signal from the computer 105 indicating a frequency of a sound 320 to be emitted from the emitter 305. The signal can be an electrical output with a voltage. The amplifier 310 can increase an amplitude of the signal from the computer 105 to a specified amplitude determined by the computer 105 by increasing the voltage of the signal, e.g., with an inductor, a capacitor, a diode, etc. The specified amplitude can be determined based on a distance range of the ultrasonic transducer 140. That is, the distance that the emitted sound 320 can travel is based on the amplitude of the emitted sound 320, and the amplifier 310 can thus increase a range of the ultrasonic transducer 140 by increasing the amplitude of the emitted sound 320.

The ultrasonic transducer 140 includes the receiver 315. The receiver 315 receives a sound 325 in the ultrasonic frequency range. The receiver 315 can receive the sound 325 originally emitted from the emitter 305 as sound 320 reflected off an object, e.g., a pedestrian, another vehicle 101, etc. Based on a time elapsed between emission of the sound 320 from the emitter 305 and receipt of the sound 325 by the receiver 315, the computer 105 can determine a distance between the ultrasonic transducer 140 and the object from which the sound 325 reflected.

Figure 4B:
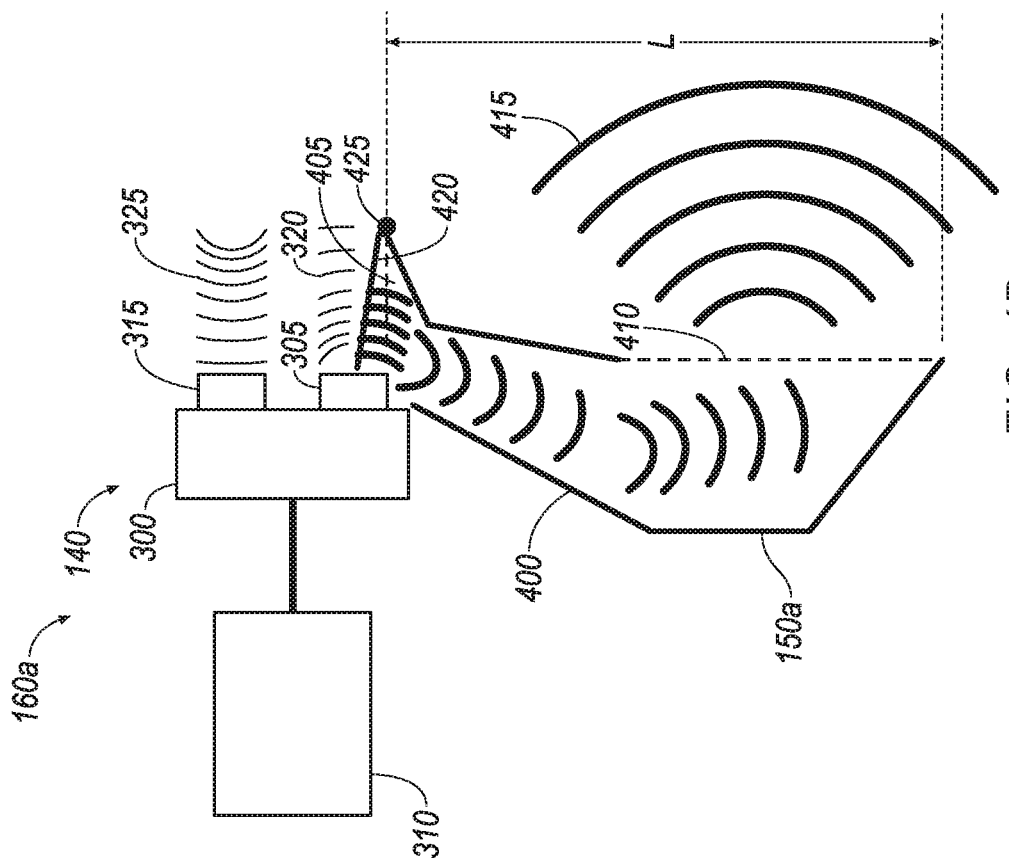
FIGS. 4A-4E illustrate an example frequency modifier.
Figure 4A:
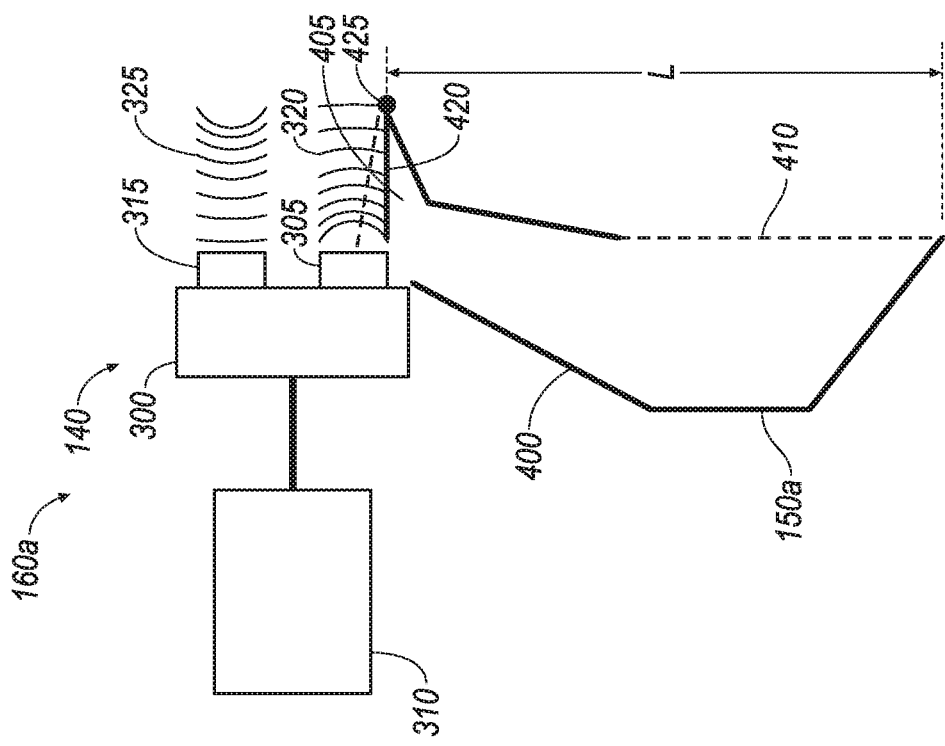
Figure 4E:
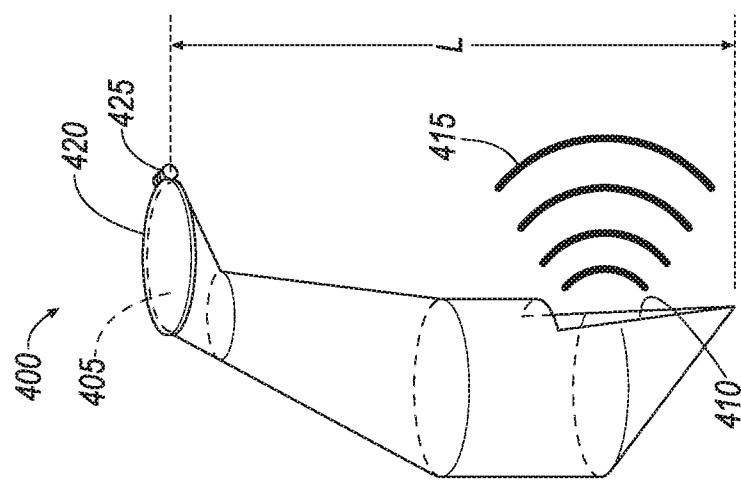
Figure 4D:
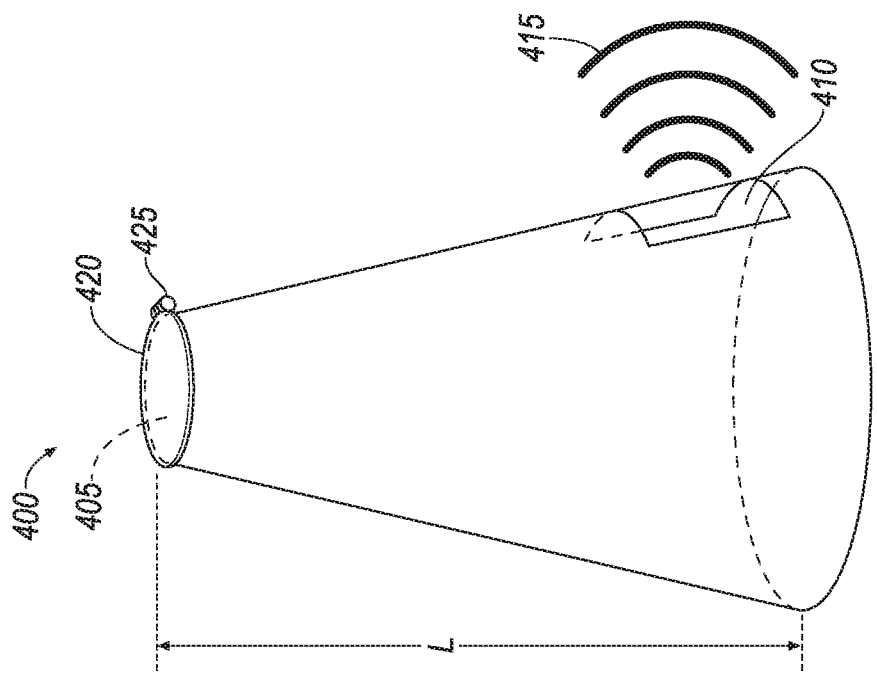
Figure 4C:
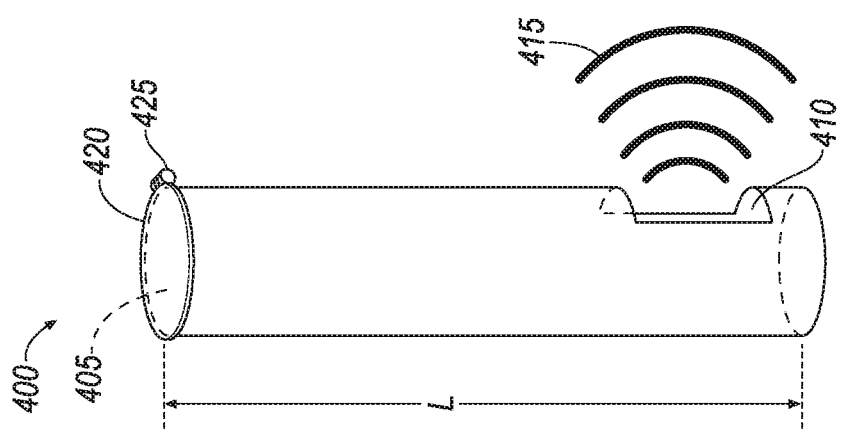

FIGS. 4A-4E illustrate an example sound generator 160a including the ultrasonic transducer 140 with an example frequency modifier 150a. The frequency modifier 150a includes a tube 400. The tube 400 extends from a first opening 405 to a second opening 410. The tube 400 is shaped to receive a first sound 320 in the ultrasonic frequency range in the first opening 405 and to reduce the frequency to emit a second sound 415 in an audible frequency range from the second opening 410. For example, the tube 400 has a length L, and the length L defines a "fundamental" frequency (i.e., the lowest possible frequency of a standing wave in the tube 400) of a sound 415 emitted from the second opening 410. The tube 400 can be an open cylindrical tube 400, as shown in FIG. 4C with a constant diameter having a fundamental frequency $$\frac{v}{2L},$$

where v the speed of sound (typically about 340 m/s in air). When the first sound 320 emitted by the ultrasonic transducer 140 enters the first opening 405, the frequency modifier 105a emits a second sound 415 at the second opening 410 at the fundamental frequency. Alternatively, the tube 400 can have a different shape, e.g., a tube 400 having a varying diameter as shown in FIGS. 4A-4B and 4E, a conical cylinder as shown in FIG. 4D, etc., to emit a different fundamental frequency. The fundamental frequency of the tube 400 is achieved based on the shape of the tube 400, and the tube 400 can be shaped to emit a sound 415 at a specific fundamental frequency, e.g., a frequency in the audible frequency range. That is, a size and shape of the tube 400 can be determined to achieve a specified fundamental frequency.

The frequency modifier 150a of FIGS. 4A-4E can include a door 420. The door 420 can be movable attached to the first opening 405 of the tube 400, e.g., with a hinge. The door 420 can be movable from a closed position to an open position. The tube 400 can include a motor 425 attached to the door 420 that rotates the door 420 from the closed position to the open position. In the example of FIG. 4A, the door 420 is in the closed position. In the example of FIG. 4B, the door 420 is in the open position. When the computer 105 determines to emit a sound 415 in the audible frequency range, the computer 105 can actuate the motor 425 to move the door 420 from the closed position to the open position. The door 420 can reflect the first sound 320 emitted from the emitter 305 into the tube 400, and the tube 400 can emit the second sound 415 in the audible frequency range from the second opening 410. Thus, the computer 105 can actuate the motor 425 to move the door 420 upon determining to emit a sound 415 in the audible frequency range.

Figure 5:
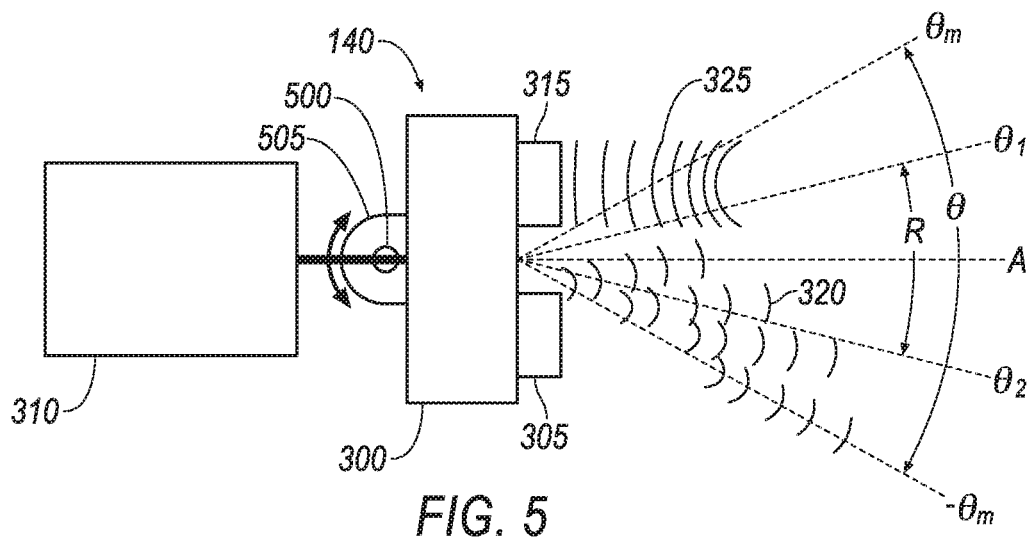
FIG. 5 illustrates an example rotator rotating the example ultrasonic transducer.

FIG. 5 illustrates rotation of the ultrasonic transducer 140. The ultrasonic transducer 140 can include a motor 500. The motor 500 can be fixed to an extension 505 of the base 300. Alternatively, the motor 500 can be fixed to an extension (not shown) of the amplifier 310. When the computer 105 actuates the motor 500, the motor 500 rotates the extension 505, rotating the base 300 of the ultrasonic transducer 140. The motor 500 can rotate the ultrasonic transducer 140 from a neutral position to an angle θ relative to the neutral position. The motor 500 can rotate the ultrasonic transducer 140 to a maximum possible rotated angle $\theta_m$ relative to the neutral position. The maximum rotated angle $\theta_m$ can be determined based on physical constraints of the construction of the base 300 and the extension 505. In the example of FIG. 5, the neutral position has an angle $\theta=0$, and the angle $\theta$ is defined to be positive in a counterclockwise direction relative to an axis A along the neutral position and negative in a clockwise direction relative to the axis A along the neutral position. The axis of rotation of the motor 500 is normal to a plane of rotation in which the angle $\theta$ is defined. Thus, the motor 500 can rotate the ultrasonic transducer 140 to an angle $\theta$ clockwise or counterclockwise up to the maximum rotated angle $\theta_M$, i.e., to an angle $\theta \in [-\theta_m, \theta_m]$.

The computer 105 can determine to rotate the ultrasonic transducer 140 between a first angle $\theta_1$ and a second angle $\theta_2$. The first and second angles $\theta_1$, $\theta_2$ can be determined based on a direction to emit a sound 320. The ultrasonic transducer 140 typically can only emit a sound 320 in a forward direction extending out from the emitter 305. When rotating the ultrasonic transducer 140 between the angles $\theta_1$, $\theta_2$, the sound 320 emitted from the ultrasonic transducer 140 can extend to an arc length R based on the angles $\theta_1$, $\theta_2$, emitting the sound 320 to directions that a stationary ultrasonic transducer 140 could not reach. The first angle $\theta_1$ can be $\theta_{-M}$, i.e., the maximum rotated angle $\theta_M$ in the clockwise direction. The second angle $\theta_2$ can be $\theta_M$, i.e., the maximum rotated angle $\theta_M$ in the counterclockwise direction. Alternatively, the first and second angles $\theta_1$, $\theta_2$ can be angles between the maximum rotated angles $-\theta_m$, $\theta_m$. The motor 500 can be used with one of the frequency modifiers 150a, 150b, 150c, 150d to both modify the frequency of the emitted sound 320 and emit the sound 320 to directions that a stationary ultrasonic transducer 140 could not reach.

Figure 6A:
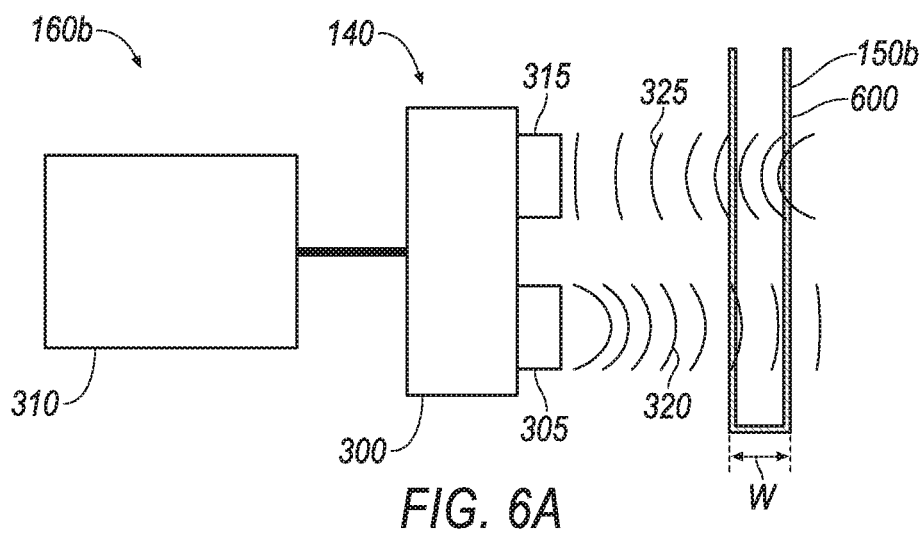
FIGS. 6A-6B illustrate another example frequency modifier.
Figure 6B:
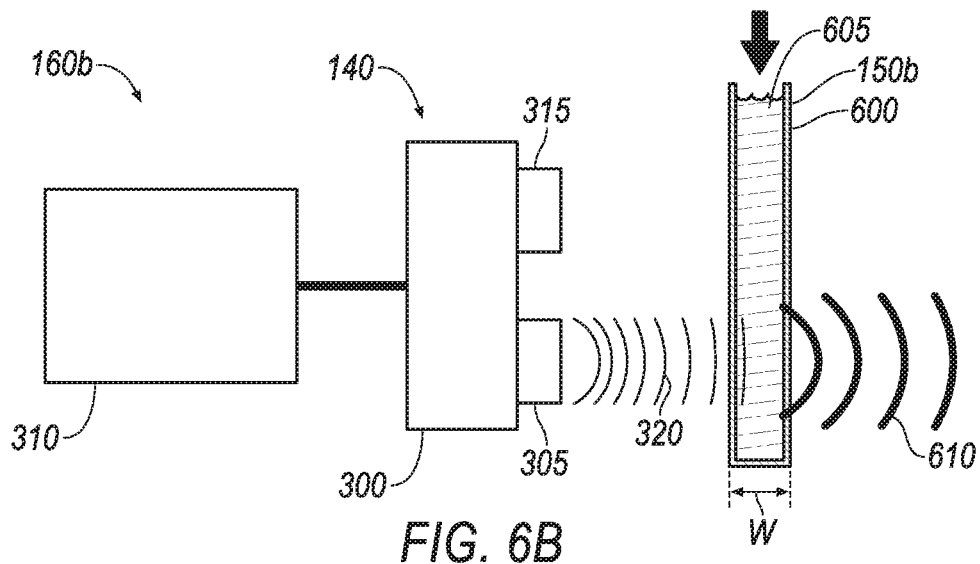

FIGS. 6A-6B illustrate another example sound generator 160b including a frequency modifier 150b. The frequency modifier 150b of FIGS. 6A-6B includes a fluid tank 600. The fluid tank 600 extends across the emitter 305 and the receiver 315. The fluid tank 600 is shown in FIGS. 6A-6B in cross-section. When the fluid tank 600 is empty, as shown in FIG. 6A, the ultrasonic sound 320 emitted by the emitter 305 passes through the fluid tank 600, and a sound 325 received by the receiver 315 passes through the fluid tank 600. The computer 105 can actuate a fluid pump (not shown) to fill the fluid tank 600, as shown in FIG. 6B. The fluid pump can fill the fluid tank 600 with a liquid 605, e.g., water, windshield washer cleaner, etc., from a fluid reservoir (not shown). The fluid reservoir can be, e.g., a washer fluid reservoir, a water reservoir, etc. When the fluid tank 600 is filled with the liquid 605, the first sound 320 emitted by the ultrasonic transducer 140 travels through the liquid 605, and, based on the density of the liquid 605 and a width W of the fluid tank, the fluid tank 600 emits a second sound 610 at a frequency in the audible frequency range. For example, the computer 105 can actuate the emitter 305 to emit the ultrasonic sound 320 as a plurality of pulsed signals and differing time intervals to generate the second sound 610 in the audible frequency range through destructive interference of the pulsed signals. In another example, the fluid tank 600 can be shaped as a lens that refracts the ultrasonic sound 320 that, when passed through the liquid 600, reduces the frequency of the ultrasonic sound 320 to the second sound 610 in the audible frequency range. The fluid tank 600 can be shaped to a specified width W, determined based on empirical testing, to emit the second sound 610 at a specific frequency in the audible frequency range when the fluid tank 600 is filled with the liquid 605.

Figure 7:
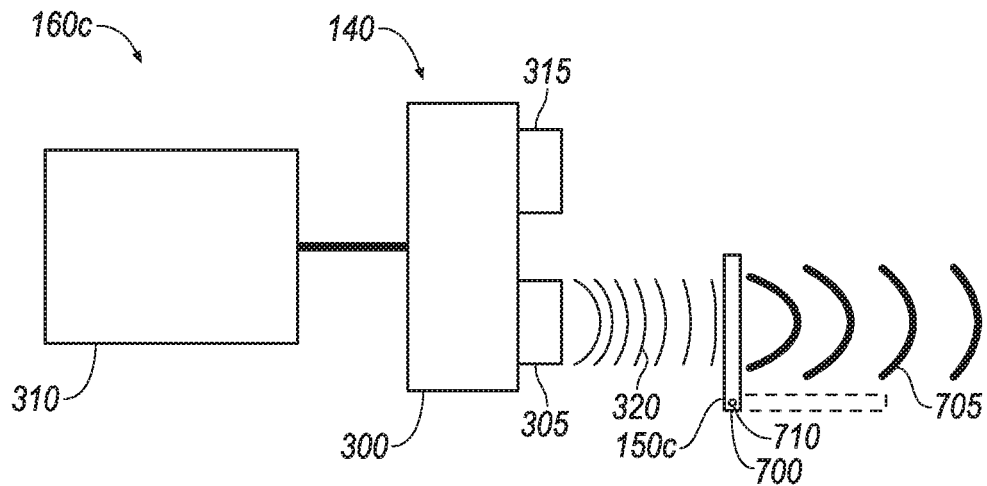
FIG. 7 illustrates another example frequency modifier.

FIG. 7 illustrates another example sound generator 160c including a frequency modifier 150c. The frequency modifier 150c of FIG. 7 includes at least one sheet 700. The sheet 700 is movable from a stowed position, shown in broken lines, to a deployed position. The sheet 700 can be attached to a motor 710. The motor 710 can be fixed to a vehicle 101 body, and can rotate the sheet 700 from the stowed position to the deployed position. When the motor 710 moves the sheet 700 in front of the emitter 305 to the deployed position, the sheet 700 receives a first sound 320 emitted from the emitter and emits a second sound 705 at a frequency in the audible frequency range.

The sheet 700 can be constructed to emit a sound 705 with a specified frequency. Each sheet 700 has a mass M, typically measured in units of kilograms (kg), and is constructed of a material having a stiffness K (e.g., a bulk modulus), typically measured in units of gigapascals (GPa). The sheet 700 can be constructed with specific materials and dimensions to have a fundamental resonant frequency $\omega$ in the audible frequency range. The fundamental resonant frequency $\omega$ is related to the mass M and the stiffness K as follows:

$$\omega \propto \sqrt{\frac{K}{M}} \qquad (1)$$

The sheet 700 can be constructed, based on empirical testing, to have a fundamental resonant frequency $\omega$ in the audible frequency range. That is, a material of the sheet 700 can be specified to have a specific stiffness K, and the sheet 700 can be sized to have a specific mass M such that the sheet 700 emits a sound 705 at a specified frequency $\omega$. For example, the sheet 700 can be constructed of aluminum having a stiffness K of about 70 GPa, or polystyrene having a stiffness K of about 4 GPa, or another plastic having a stiffness K of about 2-6 GPa. Upon selecting a specific material, the sheet 700 can be sized to a specific mass M, determined by empirical testing, to emit the sound 705 at the specified frequency $\omega$. When the sheet 700 receives the first sound 320 in the ultrasonic frequency range, the sheet 700 can emit a second sound 705 at the specified fundamental resonant frequency $\omega$ in the audible frequency range. For example, the fundamental resonant frequency $\omega$ can be a rational multiple lower than a frequency of the first sound 320 (as specified by the computer 105 to emit from the emitter 315), e.g., ½ (i.e., an octave lower), ¼ (i.e., two octaves lower), etc.

Figure 8A:
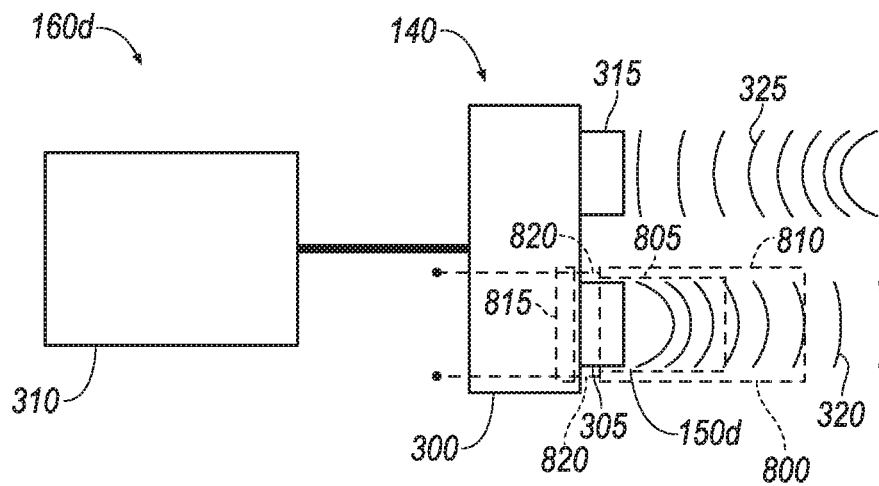
FIGS. 8A-8B illustrate another example frequency modifier.
Figure 8B:
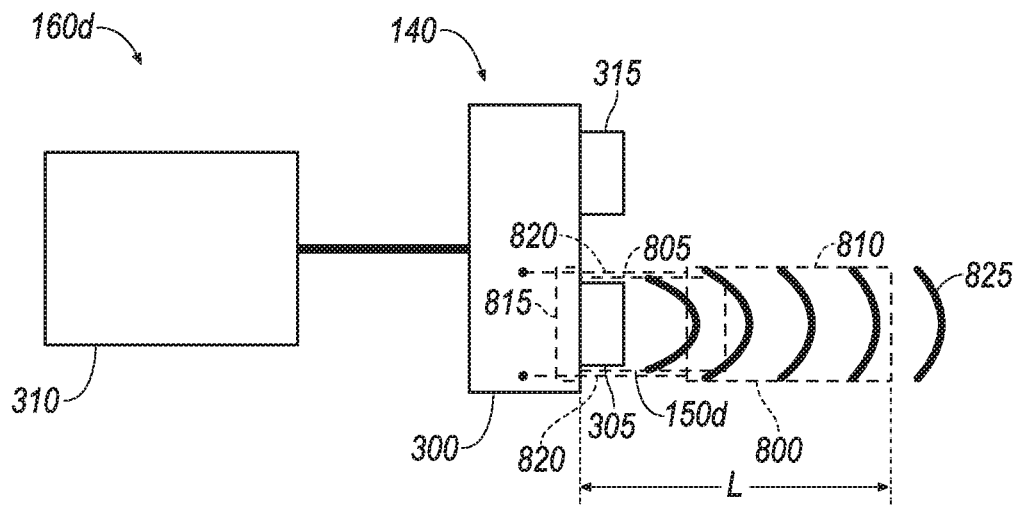

FIGS. 8A-8B illustrate another example sound generator 160d including a frequency modifier 150d. The frequency modifier 150d includes a telescoping tube 800. The telescoping tube 800 includes a first tube 805 and a second tube 810. The first tube 805 can be fixed to the base 300 of the ultrasonic transducer 140, and the second tube 810 can be movably attached to the first tube 805. For example, the second tube 810 can be movably attached to a track (not shown) on the first tube 805, and a motor 815 can extend shafts 820 attached to the second tube 810, moving the second tube 810 to the deployed position. Alternatively, the second tube 810 can include a rack (not shown) engaged with a pinion (not shown) attached to the motor 815, and when the motor 815 rotates, the pinion moves the rack, extending the second tube 810 to the deployed position. Yet alternatively, the first tube 805 and/or the base 300 can include a servo-actuated device with a spring release attached to the second tube 810. The computer 105 can actuate the motor 815 and/or the servo-actuated device to extend the frequency modifier 150d to modify a frequency of an emitted sound 320 from the emitter 305 to emit a second sound 825 in the audible frequency range.

The frequency modifier 150*d* is movable from a stowed position, as shown in FIG. 8A to a deployed position, as shown in FIG. 8B. The computer 105 can actuate the motor 815 to move the second tube 810 from a stowed position to a deployed position. When the second tube 810 is in the deployed position, the second tube 810 can reduce the frequency of a sound 320 emitted from the emitter to emit a second sound 825 in the audible frequency range. When the second tube 810 is in the deployed position, the telescoping tube 800 can extend a length L from the base 300 of the ultrasonic transducer 140, as shown in FIG. 8B. The second tube 810 can be sized to extend the telescoping tube 800 to a specific length L to emit the second sound 825 at a specified frequency in the audible frequency range, e.g., as described above for the frequency modifier 150*a* and shown in FIGS. 4A-4B. Furthermore, as described above, the telescoping tube 800 can be constructed of a material having a mass M and a stiffness K to generate a specific fundamental resonant frequency w, as described above for the frequency modifier 150*c* and shown in FIG. 7. Alternatively, the computer 105 can actuate the frequency modifier 150*d* to move the second tube 810 to an intermediate position between the stowed position and the deployed position. The computer 105 can determine the intermediate position based on the specific length L to emit the second sound 825 at the specified frequency in the audible frequency range.

Figure 9:
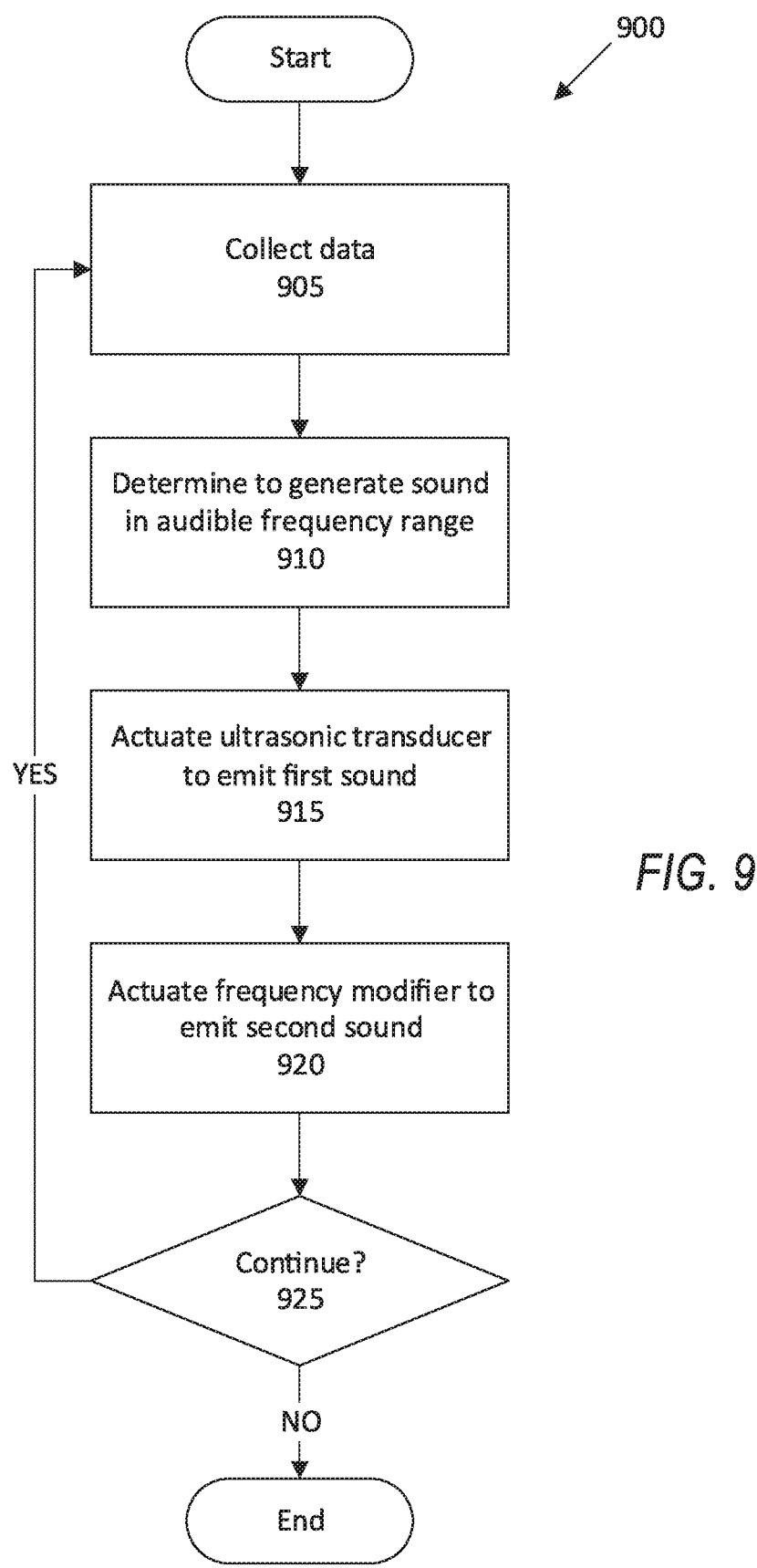
FIG. 9 is a block diagram of an example process for emitting a sound in an audible frequency range.

FIG. 9 illustrates an example process 900 for operating an ultrasonic transducer 140. The process 900 begins in a block 905, in which the computer 105 actuates one or more sensors 110 to collect data 115. The computer 105 can collect data 115 about objects near the vehicle 101 to, e.g., actuate the AVAS to generate a sound 415, 610, 705, 825 in an audible frequency range.

Next, in a block 910, the computer 105 determines to generate a sound 415, 610, 705, 825 in the audible frequency range. As described above, upon detecting an object within a distance threshold of the vehicle 101, the computer 105 can determine to generate a sound 415, 610, 705, 825 in the audible range to warn nearby pedestrians of the presence of the vehicle 101. That is, when the computer 105 determines to warn nearby pedestrians, cyclists, etc. of the presence of the vehicle 101 (e.g., according to a conventional AVAS), the computer 105 can determine to generate a sound 415, 610, 705, 825 typically perceptible by human ears.

Next, in a block 915, the computer 105 actuates an ultrasonic transducer 140 to emit a first sound 320 in an ultrasonic frequency range. As described above, the computer 105 can actuate an emitter 305 of the ultrasonic transducer 140 to emit a first sound 320 from the ultrasonic transducer 140 in the ultrasonic frequency range. The computer 105 can further actuate the amplifier 310 to generate the first sound 320 at an amplitude that is expected to be perceptible to human ears near the vehicle 101.

Next, in a block 920, the computer 105 actuates a frequency modifier 150 (e.g., one of the frequency modifiers 150*a*-150*d* described above) to modify the frequency of the first sound 320 to emit a second sound 415, 610, 705, 825 in the audible frequency range. As described above, the frequency modifier 150 can reduce the frequency of the first sound 320 to emit the second sound 415, 610, 705, 825 in the audible frequency range. For example, as shown in FIGS. 4A-4B, the computer 105 can actuate a door 420 of a frequency modifier 150*a* at a first opening 405 of a tube 400 to receive the first sound 320 and emit the second sound 415 from a second opening 410 of the tube 400. The blocks 915 and 920 can be alternatively performed simultaneously or in reverse order, i.e., the computer 105 can actuate the frequency modifier 150 and the ultrasonic transducer 140 simultaneously or the computer 105 can actuate the frequency modifier 150 and then actuate the ultrasonic transducer 140 to emit the first sound 320.

Next, in a block 925, the computer 105 determines whether to continue the process 900. For example, the computer 105 can determine to continue generating the sound 415, 610, 705, 825 in the audible frequency range and at an amplitude that is expected to be heard by human ears, e.g., pedestrians, cyclists, etc., near the vehicle 101 of the presence of the vehicle 101. If the computer 105 determines to continue, the process 900 returns to the block 905 to collect more data 115. Otherwise, the process 900 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 900, one or more of the steps could be omitted, or the steps could be executed in a different order than shown in FIG. 9. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   emit a first sound from a vehicle ultrasonic sensor mounted to a vehicle in an ultrasonic frequency range; and
   open a door of a frequency modifier of the vehicle, the frequency modifier including a tube having a first opening and a second opening and the door rotatably attached to the first opening, to modify a frequency of the emitted sound to a second sound in an audible frequency range when the emitted sound exits the second opening.

2. The system of claim 1, wherein the ultrasonic sensor includes an emitter and a base, and wherein the instructions further include instructions to rotate the emitter to a specified angle relative to the base.

3. The system of claim 2, wherein the instructions further include instructions to rotate the emitter between a first specified angle relative to the base and a second specified angle relative to the base.

4. A system, comprising:
   a vehicle ultrasonic sensor mounted to a vehicle including an emitter; and
   a frequency modifier of the vehicle including at least one of a tube, a sheet, and a fluid tank, the frequency modifier having a resonant frequency in an audible frequency range and arranged to receive a sound from the emitter to modify a frequency of the emitted sound to the resonant frequency in the audible frequency range, wherein the tube includes a first opening and a second opening and a door rotatably attached to the first opening.

5. The system of claim 4, wherein the vehicle ultrasonic sensor includes a base, and wherein the emitter is rotatable to a specified angle relative to the base.

6. The system of claim 5, wherein the emitter is rotatable between a first specified angle relative to the base and a second specified angle relative to the base.

7. A system, comprising a computer including a processor and a memory, the memory storing instructions executable by the processor to:
   emit a first sound from a vehicle ultrasonic sensor mounted to a vehicle in an ultrasonic frequency range; and
   move a sheet from a stowed position to a deployed position, the sheet having a resonant frequency that is a rational multiple lower than the frequency of the first sound, to modify a frequency of the first sound to a second sound in an audible frequency range.

8. The system of claim 7, wherein the ultrasonic sensor includes an emitter and a base, and wherein the instructions further include instructions to rotate the emitter to a specified angle relative to the base.

9. The system of claim 8, wherein the instructions further include instructions to rotate the emitter between a first specified angle relative to the base and a second specified angle relative to the base.

* * * * *